INVENTORS
Adrianus Korpel
Robert L. Whitman
BY
ATTORNEY

United States Patent Office 3,515,458
Patented June 2, 1970

3,515,458
RADIATION SCANNING SYSTEM
Adrianus Korpel, Prospect Heights, and Robert L. Whitman, Oak Park, Ill., assignors to Zenith Radio Corporation, Chicago, Ill., a corporation of Delaware
Filed Jan. 13, 1967, Ser. No. 609,125
Int. Cl. G02f 1/34, 1/38
U.S. Cl. 350—160                                                  10 Claims

ABSTRACT OF THE DISCLOSURE

A beam of coherent radiation, such as light, is caused to enter an optical cavity in which it is multiply reflected. An offset between different reflections causes the beam at the end of each round trip through the cavity to be laterally spaced from the beam in the previous round trip so as to create in the cavity a plurality of beams having individually different relative phase. The configuration of the cavity or additional lens elements included therein cause these plurality of beams to be imaged and superimposed upon one partially reflective surface in the cavity. By changing the optical path length through the cavity, the manner of phase addition of the plurality of beams is altered which in turn changes the point of maximum intensity of the superimposed beams on the one reflector. As a result, the beam emerging from the cavity is displaced.

---

Numerous systems have been proposed over the years for deflecting a beam of optical radiation. As utilized herein, the term "radiation" includes opto-electromagnetic energy in both the visible and invisible portions of the spectrum. Particularly since the advent of the laser, which produces an intense beam of coherent radiation, considerable effort has been devoted to the development of systems for causing a laser beam to be scanned. One attractive deflection or scanning system is that disclosed and claimed in the copending application of Adrianus Korpel, Ser. No. 528,217, filed Feb. 17, 1966. That system will be described in somewhat greater detail subsequently in connection with FIG. 1. While it has been utilized quite successfully, in certain applications its performance has been found to be limited by beam spread. Also, when it is sought to achieve very high resolution, that system requires proportionately large driving elements and these in turn lead to undesirable difficulties.

It is accordingly a general object of the present invention to provide a new and improved radiation scanning system which avoids such limitations as those just indicated.

A more specific object of the present invention is to provide a radiation scanning system utilizing principles disclosed in the aforesaid Korpel application but in which certain operational characteristics are significantly improved.

Another object of the present invention is to provide a new and improved radiation scanning system which requires comparatively few elements individually of a simple nature.

A radiation scanning system in accordance with the present invention is composed of an optical cavity which includes at least a pair of reflectors and which is multiply reflective of an input beam of coherent radiation to develop from that input beam a plurality of spaced secondary beams with adjacent ones of those secondary beams having individually different relative phase. Included in the cavity are means for imaging and superimposing the plurality of secondary beams upon one of the reflectors. Finally, the system includes means for developing and projecting the input beam into the cavity.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements and in which:

Figure 1:
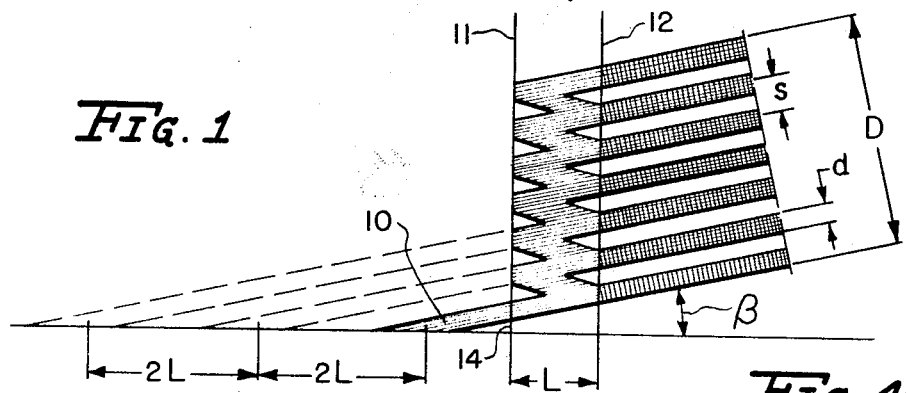
FIG. 1 is schematic diagram of the radiation scanning system disclosed in the aforesaid Korpel application.

Since the systems to be described with respect to FIGS. 3–6 incorporate principles included within the basic system of the aforesaid Korpel application, that system as depicted in FIG. 1 is first described. It includes an incoming beam 10 of time-coherent light and a pair of mutually-facing substantially parallel spaced mirrors or reflectors 11 and 12. Mirror 12 is partially transmissive of the light in beam 10. Beam 10 advantageously is produced by a laser which projects it toward mirror 11. The term "light" is used herein as a specific example only, the techniques being applicable to other optical radiation as well.

Mirror 11 is this instance has an aperture 14 aligned to accept beam 10 and the mirrors are oriented relative to the beam at an angle $\beta$ from their normal to establish multiple reflections of the beam between the mirrors, progressively from the bottom to the top as illustrated. At each of the points of reflection on mirror 12, a portion of the light is transmitted through that mirror to form a corresponding plurality of substantially parallel secondary beams in the near field beyond mirror 12. By virtue of the reflections and the time-coherence of the light, a relative phase difference exists between each successive different one of the secondary beams. For a given light wavelength $\lambda$, angle of incidence $\beta$ and mirror spacing L, the ultimate far-field beam resulting from combination of the secondary beams has a composite wavefront effectively made up of the individual secondary-beam wavefronts, and the far-field beam propagates in a given direction normal to the surface effectively defined by the secondary-beam wavefronts.

In operation, the effective optical path length between mirrors 11, 12 is varied. For a given change in that path length, the ultimate far-field beam resulting from the secondary beams exhibits a composite wavefront which propagates in a direction different from that of the composite wavefront produced before the change in path length. In this manner, the far-field beam is caused to scan or to be deflected over a range of angles lying in the plane of the paper in FIG. 1.

In the particular system illustrated in FIG. 1, mirrors 11 and 12 are stationary and are spaced apart by a fixed distance. Scanning of the emerging composite light beam is caused to occur by changing the wavelength of the light in beam 10. Alternatively, the optical path length itself may be physically changed. In one arrangement to that end, mirror 12 is stationary and mirror 11 is electrically conductive and constitutes one electrode of a piezoelectric transducer. Another electrode on the transducer is stationary so that upon excitation the transducer expands and contracts which in turn changes the spacing between mirrors 11 and 12.

In a modified arrangement, mirrors 11 and 12 are affixed to opposing faces of a body of electro-optical material such as ADP, KDP or KTN. In this case, mirrors 11 and 12 are electrically conductive, or at least are mirror surfaces on electrically-conductive material, so as to form electrodes individually connected across a source of electric potential. The electric field developed between the electrodes in response to the applied electrical signal varies the index of refraction of the material and thereby likewise changes the optical path length between the mirrors. Still other alternative arrangements are disclosed in the aforesaid Korpel application which permit a change in the actual or effective optical path length between mirrors 11 and 12.

Mirrors 11 and 12 have amplitude reflectivities $R_1$ and $R_2$ and the mirrors together define a light aperture D. Incoming light beam 10 and each of the secondary beams emerging from mirror 12 have a diameter $d$, neglecting diffraction spread of the multiply-reflected beam segments between the mirrors. The separation $s$ between the secondary beams is in accordance with the expression:

$$s = 2L \sin \beta \qquad (1)$$

In order to avoid resonant entrance conditions, care preferably is taken to insure that the beams do not overlap; thus, $s > d$.

A variation $\Delta L$ in the optical path length between mirrors 11 and 12 introduces a progressive phase variation of $4\pi \Delta L / \lambda$ radians per secondary beam across aperture D. This in turn changes the propagation direction of the resultant far-field wavefront by the value $2\Delta L/s$. The maximum useable phase difference between neighboring secondary beams in $\pm \pi$, corresponding to a $\Delta L$ of $\pm \frac{1}{4}\lambda$ and resulting in a maximum total scan angle of $\lambda/s$.

The beam spread in the far-field is determined by the overall aperture width and equals $\lambda/D$. Hence, the number of resolvable scan angles N is equal to $D/s$, which is an expression for the number of secondary beams in the phased array of those beams.

The upper limit to the useable number of secondary beams depends upon whether the system is aperture limited or loss limited. When the system is aperture limited, i.e., the value of D is finite and $R_1 = R_2$ and the latter approach unity, the condition is that the last (top) beam in the array of secondary beams must not have a diffraction spread greater than that of the aperture itself; this is expressed:

$$N2L\lambda d < D \qquad (2)$$

When the secondary beams just touch, i.e., $s=d$, this expression becomes $$N < (D^2 L \lambda)^{1/3} \qquad (3)$$

When, on the other hand, the system is loss limited (i.e., $D = \infty$ and $R_1 R_2$ is less than unity), the system performance is described by means of an effective aperture value $D_e$. It can be shown that the value $D_e$ is equal to the length (in the direction of the multiple reflections) of that part of mirror 12 for which the secondary beams are attentuated by less than $\pi$ nepers, as detailed more fully in "An Ultrasonic Light Deflection System" by A. Korpel et al., IEEE Journal on Quantum Electronics, vol. QE-1, pp. 60-61, April 1965. In terms of the reflectivities $R_1 R_2$.

$$D_e = \pi d / (1 - R_1 R_2) \qquad (4)$$

and $$N_{max} = \pi / (1 - R_1 R_2) \qquad (5)$$

With realizable reflectivities $R_1 R_2$ of 99.7 percent, $10^3$ resolvable scan angles are feasible for the system of FIG. 1.

Figure 2:
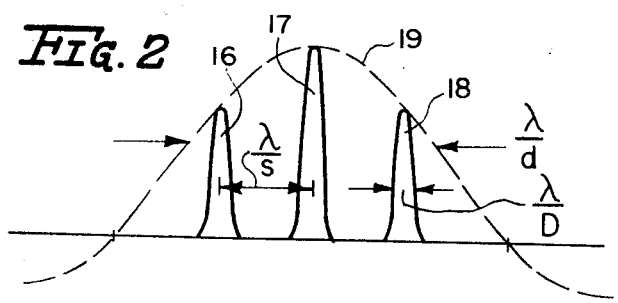
FIG. 2 depicts response characteristics of a system like that in FIG. 1 and is also useful in explaining the operation of the systems shown in the subsequent figures.

As thus far disclosed, the analysis neglects the presence of multiple lobes in the far-field. An exact analysis of the operation of the device conveniently uses the virtual secondary beam sources located on a line perpendicular to mirrors 11 and 12 and spaced 2L apart as shown in FIG. 1. Additional analysis reveals that the number of significant side lobes (i.e., comparable in intensity to the main beam) is approximately $2s/d$, and they are spaced $\lambda/s$ apart. With reference to FIG. 2, the multiple lobes are shown by individual response curves 16, 17 and 18 which are spaced apart by $\lambda/s$ and have a half-power width of $\lambda/D$. The lobes have relative amplitudes so as to lie within an envelope 19 which defines the far field of the light emerging from the system and has a half-power width of $\lambda/d$.

Certain limitations upon the FIG. 1 system were mentioned in the introduction. The spacing between mirrors 11 and 12 is limited by beam spread, and a large mirror spacing with longer paths is needed to form a large number of secondary beams. Such beam spread places a limit on the amount of electro-optic material, for example, that can be placed between the two mirrors in order to achieve scanning. Also, mirror size determines the aperture of the phased array system and a large aperture is needed for high resolution. When scanning is to be accomplished by moving one of the mirrors with a piezoelectric or like driving element, a large mirror requires that the driving element be correspondingly large. Large transducers or drivers have unavoidable mechanical resonances which tend to produce ringing when they are driven by a scanning potential.

Figure 3:
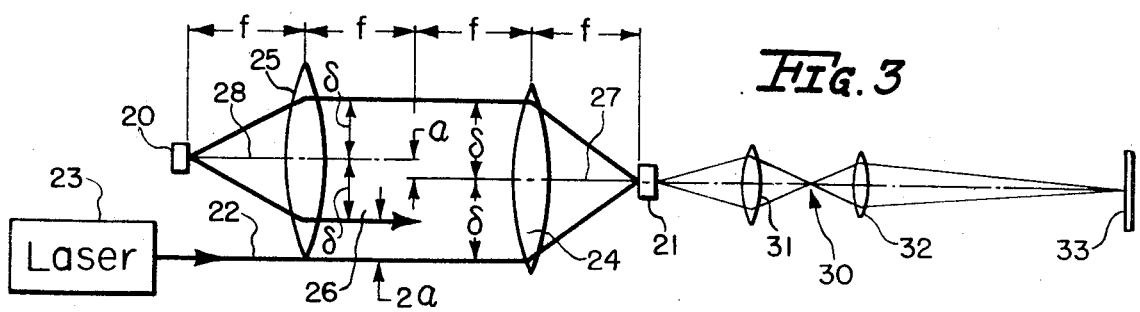
FIG. 3 is a schematic diagram of one embodiment of the present invention.

It is contemplated in accordance with the present invention to utilize a form of periodic focusing in the system in order to overcome the limitation of beam spread. The invention further contemplates arrangements in which the mirror element that is moved in order to achieve scanning need only be as large as the diffraction-limited spot size of the beam which enters and is multiply reflected. To the accomplishment of these ends, the radiation scanning system of FIG. 3 is composed of an optical cavity including a pair of reflectors 20 and 21 arranged to multiply reflect an input beam 22 from a laser 23 in a manner which develops from the input beam a plurality of spaced secondary beams, such as beam 26, with adjacent ones of those secondary beams having individually different relative phase.

Thus, incoming beam 22 is bent by a first optical lens 24 so as to be focused upon and reflected from reflector 21 back through another portion of lens 24 and on through a second lens 25. The latter bends the beam toward and focuses it upon reflector 20 from which the beam is reflected back through lens 25 along second path 26 parallel to but spaced from the original input path by a distance $2a$. Lens 24 together with reflector 21 define a first reflective system having an optical axis 27 while lens 25 together with reflector 20 define another optical system having an optical axis 28 parallel to but spaced laterally from axis 27 by a distance $a$.

In first traversing lens 24, the incoming light beam 22 is deflected a distance $\delta$ to axis 27 and after reflection from reflector 21 and again traversing lens 24 the beam is located a distance $\delta$ to the other side of axis 27. However, in this part of its travel the beam is only a distance $\delta - a$ from axis 28 at the other end of the system so that after reflection from reflector 20 and travel back through lens 25 the displacement $2a$ results between paths 22 and 26. On again making a round trip from path 26 around the optical system, the beam travels back through lens 25 the next time displaced another distance $2a$ away from path 26, and such displacement continues until the beam misses one of lenses 24 and 25. The result is the production between lenses 24 and 25 of a set or plurality of periodically refocused parallel beams, separated by a distance $2a$ and having a phase difference between adjacent beams equal to the round trip optical path length.

Further in accordance with the invention, the system is arranged so that the plurality of these beams within the cavity, which may be referred to as secondary beams, are imaged and superimposed upon reflector 21. To this end, reflector 21 is disposed in the focal plane of lens 24. Reflector 20 similarly is disposed in the focal plane of lens 25 so that the secondary beams also are so imaged on that reflector. With the lenses each having a focal length $f$, the individual reflectors thus are spaced by the distance $f$ from the respective lenses. At the same time, lenses 24 and 25 are mutually spaced by a distance $2f$. It will be noted that the input beam along path 22 is introduced at a focal plane of the system.

By reason of the imaging of the plurality of beams developed within the system, that array of beams develops a far-field pattern on reflector 21. That is, the far-field pattern of the plurality of secondary beams is developed in the scanning system itself as contrasted with the system of FIG. 1 where it is developed externally beyond the scanning system. Thus, the scanning principles are the same as in FIG. 1, but the place of far-field development is different and, as noted, the beam is repeatedly refocused during its travel. Reflector 21 preferably is composed of a multiplicity of layers of dielectric material like the dielectric mirrors conventionaly used to form laser cavities. It is partially transmissive of the light and hence of the far-field pattern developed thereupon. Consequently, the envelope of the light pattern transmitted through reflector 21 has a shape generally like that of curve 19 in FIG. 2.

In operation, each of the multiply reflecting secondary beams incident upon reflector 21 by itself would form a particular diffraction pattern on the reflector like curve 19 of FIG. 2. This occurs each time the beam is caused again to be incident upon reflector 21. The superposition of these individual diffraction patterns each of a given width results in the production of a much narrower composite diffraction pattern the exact location of which depends on the relative phase between the rays. Again with reference to FIG. 2, the result is that of enhancing and narrowing the central part of curve 19 to produce primary lobe 17. Moreover, the exact location of the enhanced lobe may be moved to one side or the other of the position shown in FIG. 2 by changing the relative phase of the light in the laterally adjacent secondary beam paths.

Like in the system of FIG. 1, the relative phase between the adjacent beam paths within the system is changed by actually or effectively altering the optical path length through the system. Generally, this may be accomplished by any of the approaches described in the Korpel application. For example, a piezoelectric transducer may be affixed to reflector 20 and excited to effect movement of that reflector relative to the other elements in the cavity system. Similarly, the same change in path length may be effected by moving reflector 21. Alternatively, an electro-optic material may be disposed between lenses 24 and 25 and an electric field developed therein to alter its index of refraction controllably and hence change the effective optical path length in the system.

In use, the far-field pattern developed on reflector 21 preferably is magnified by a telescope 30 having an object lens 31 and an eyepiece 32 from which the resulting beam is projected to an image display screen 33. The use of telescope 30 enables a small displacement of the composite beam spot on reflector 21 to cause a large displacement of the spot appearing on screen 33. A similar magnification and projection system preferably is incorporated with the systems of subsequent FIGS. 4 to 7, to be described, although for simplification it is unnecessary to show it in connection with those figures.

It may be noted that in FIG. 3 each of the parallel spaced secondary beams within the system has the same amplitude and phase distribution across its wavefront, since the system acts as a 1:1 telescope. The total round trip optical path length in the system is $8f$. Because of this long round-trip path length, the system is quite dispersive. By utilizing a conventional gas laser typically productive of a plurality of so-called longitudinal modes, and making the round trip path length of the scanning cavity system equal to twice the length of the cavity in the laser, the different laser modes are caused to coincide in the far-field formed on reflector 21.

Figure 4:
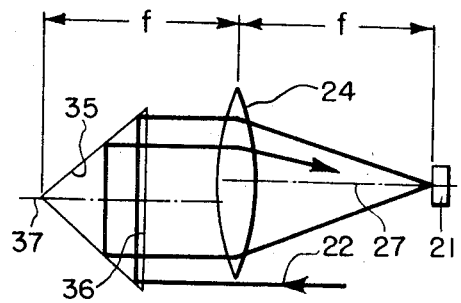
FIG. 4 is a schematic diagram of an embodiment alternative to that of FIG. 3.

An alternative form of the system as shown in FIG. 4 represents a folded version of the FIG. 3 system. Reflector 21 and lens 24 are the same as in FIG. 3 but the remainder of the optical cavity takes the form of a triangular prism 35 having its base 36 parallel to reflector 21 and its optical axis 37 parallel to but spaced from axis 27 in a manner analogous to the offset between axis 28 and axis 27 in FIG. 3. Thus, prism 35 takes the place of reflector 20 and lens 25 of FIG. 3, while operation of the two systems otherwise is the same.

Figure 5:
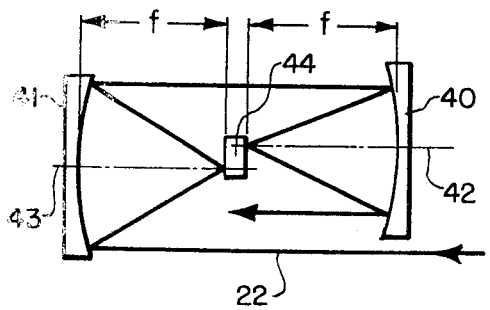
FIG. 5 is a schematic diagram of a further alternative embodiment.

The use of lenses in any optical system tends to introduce aberration. Accordingly, it is also contemplated to utilize multiply reflecting cavities which include the necessary offset to obtain the spaced plurality of secondary beams and yet which avoid the use of lenses as such. One system of this sort is illustrated in FIG. 5 wherein the cavity is defined by a pair of spherical reflectors 40 and 41 having respective optical axes 42 and 43 parallel to one another but laterally offset. The spherical reflectors are effectively confocal, each having a focal distance $f$ from a third reflector 44 disposed intermediate reflectors 40 and 41 and transverse to axes 42 and 43 which intersect reflector 44.

In this case, the developed plurality of so-called secondary beams are imaged and superimposed identically in two different locations on opposite sides of reflector 44. As shown, the incoming light beam along path 22 is first reflected by reflector 41, then off reflector 44 and then once again off reflector 41. From the latter, the beam is directed to reflector 40 by which it is reflected to the other side of reflector 44 and from the latter is reflected back to reflector 40 which in turn reflects it back toward reflector 41 along a secondary path spaced from incoming beam path 42 by twice the offset between axes 42 and 43. The superimposed or far-field pattern may be observed by making either reflector 40 or 41 semi-transparent and imaging through that reflector from reflector 44. For example, reflector 40 may be semi-transparent to the light and telescope 30, FIG. 3 used to magnify and project the image on reflector 44, viewing that latter through reflector 40.

Figure 6:
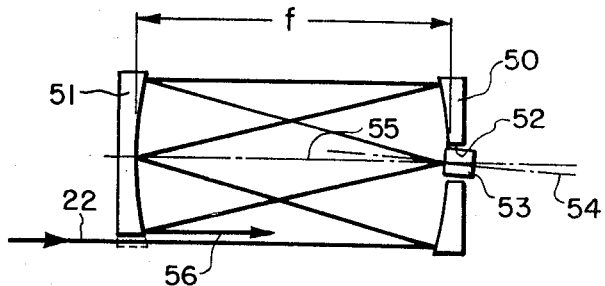
FIG. 6 is a schematic diagram of still another alternative embodiment.

In FIG. 5, reflectors 40 and 41 are effectively confocal although as indicated their optical axes are offset. FIG. 6 illustrates a nonconfocal system. In this case, mirrors 50 and 51 each are of the spherical type and are mutually spaced by their identical focal distance $f$. Without more, the light entering on path 22 would be multiply reflected in a manner such that it would continually retrace the same paths through the system. In order to provide the necessary offset so as to produce the desired spaced plurality of parallel secondary beams, mirror 50 includes a central opening 52 in which an auxiliary mirror 53 having an inner planar reflective surface is disposed.

As shown in FIG. 6, the light entering upon path 22 is reflected back and forth between mirrors 50 and 51 until at its third incidence upon reflector 50 the direction of travel is offset by a tilt given to mirror 53 to define an optical axis 54 that forms an angle with the optical axis 55 of the spherical reflectors. Consequently, the beam in subsequent path 56 is offset from the incoming beam path 22. As before, continued reflection back and forth by the beam produces still additional spaced and parallel secondary beams. Otherwise, the operation is the same as that described in more detail relative to FIG. 3 in that the different secondary beams are caused to be imaged upon and superimposed at mirror 53 with the resulting development on that mirror of a far-field pattern. The latter pattern is observable by making mirror 53 semi-transparent. In the case of FIG. 6, variation of the relative phase between adjacent ones of the secondary beams, in order to change the location of the far-field spot on mirror 53, is achievable also simply by moving mirror 53 along axis 55 so as to change the round trip path length.

In each of the systems of FIGS. 3–6, the action upon each reflection, either by the spherical nature of a mirror or by the use of a lens, is to refocus the beam and hence compensate for the tendency of the beam to spread. Consequently, large spacings between the mirrors of the cavity may be employed in order, for example, to permit the use of a substantial length of electro-optic material between elements of the system. This in turn permits a correspondingly large adjustment in the length between those elements in order to change by a large amount the phase relationship between adjacent ones of the secondary beams and thus effect a likewise large change in the position of the far-field spot. On the other hand, where scanning is accomplished by movement of a mirror as by driving it with a piezoelectric element, the driven mirror may be extremely small. Its necessary width is only that of the size of the resulting composite addition of the individual diffraction limited spots. Consequently, the mirror which is to be moved for scanning control, such as mirror 21 of FIGS. 3 or 4, mirror 44 of FIG. 5, and mirror 53 of FIG. 6 is easily displaced a comparatively large distance by but a small transducing element.

The confocal cavity system of FIG. 5 and the focal cavity system of FIG. 6 are two special cases of a class of cavities which, if unperturbed, cause an input beam, such as beam 22 in FIG. 6, to fold back on itself with the identical phase and amplitude characteristics it had when it entered the cavity. The class of cavities which have this feature is known as reentrant cavities. They are characterized by two spherical mirrors of focal lengths $f$ whose spacing is equal to $2f$, $f$, $f/1.7$, $f/3.7$, $f/14.7$, and $f/58$, to list the first six as an example.

In general the focal length $f$ and the mirror spacing $d$ of such a cavity system must satisfy the relationship $$\arccos(1-d/2f) = \pi/n \qquad (6)$$

where $n$ is an integer. By a perturbation equivalent to that accomplished by mirror 53 in FIG. 6 or an offset as in FIG. 5, any of these cavities can be utilized in practicing the invention.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A radiation scanning system comprising: a pair of laterally offset paraxial optical focusing systems including at least a pair of reflectors and defining an optical cavity which is multiply reflective of an input beam of coherent radiation to develop from said beam a plurality of spaced secondary beams with adjacent ones thereof having individually different relative phases, and to image and superimpose said plurality of secondary beams upon one of said reflectors; means for varying the effective optical path length of said secondary beams in said cavity; and means for developing and projecting said input beam into said cavity.

2. A system as defined in claim 1 in which said one reflector is partially transparent to said radiation.

3. A system as defined in claim 2 which further includes means for projecting and magnifying the portion of said radiation transmitted through said one reflector.

4. A system as defined in claim 1 in which said reflectors are mutually parallel and each of said pair of optical focusing systems includes a convergent optical lens.

5. A system as defined in claim 1 in which said one reflector is partially transparent to said radiation and the other of said reflectors is a triangular prism having a base parallel to said one reflector and in which one of said optical systems includes a convergent lens imaging said secondary beams reflected by said prism onto said one reflector.

6. A system as defined in claim 1 in which said reflectors are a pair of opposed spherical mirrors.

7. A system as defined in claim 6 in which a double-sided planar reflector is disposed midway between said mirrors and said mirrors are of substantially equal focal length corresponding to their spacing from said planar reflector.

8. A system as defined in claim 7 in which one of said mirrors is semi-transparent to said radiation.

9. A system as defined in claim 6 in which one of said mirrors has an opening therein and said one reflector is disposed in said opening.

10. A system as defined in claim 9 in which said one reflector is planar.

References Cited

UNITED STATES PATENTS

| 2,983,786 | 5/1961 | Rogers | 350—166 |
| 3,331,651 | 7/1967 | Sterzer | 350—160 |
| 3,366,892 | 1/1968 | Crowe | 331—94.5 |

FOREIGN PATENTS

| 26,669 | 1/1931 | Australia. |

OTHER REFERENCES

Procopio et al., Laser Phased Arrays, IEEE Proc. Intl. Conv., Military Electronics, 1964, UG 485M3, pp. 67–72.

Korpel, Phased Array Type Scanning of a Laser Beam, IEEE Proc., October 1966, pp. 1666–1667.

Fowler et al., A Survey of Laser Beam Deflection Techniques, October 1966, vol. 5, No. 10 Applied Optics, pp. 1675–1681.

Hardy, Active Imaging, Nature, vol. 202, No. 4929, pp. 277–278.

Pole et al., Reactive Processing of Phase Objects, Applied Physics Letters, vol. 8, No. 9, May 1, 1966, pp. 229–231.

Buck et al., Optical Beam Deflector, Applied Physics Letters, vol. 8, No. 8, Apr. 15, 1966, pp. 198–199.

RONALD L. WIBERT, Primary Examiner

J. ROTHENBERG, Assistant Examiner

U.S. Cl. X.R.

331—94.5; 350—285